J. E. SOTKA.
STUMP PULLER.
APPLICATION FILED NOV. 23, 1918.
1,315,429. Patented Sept. 9, 1919.
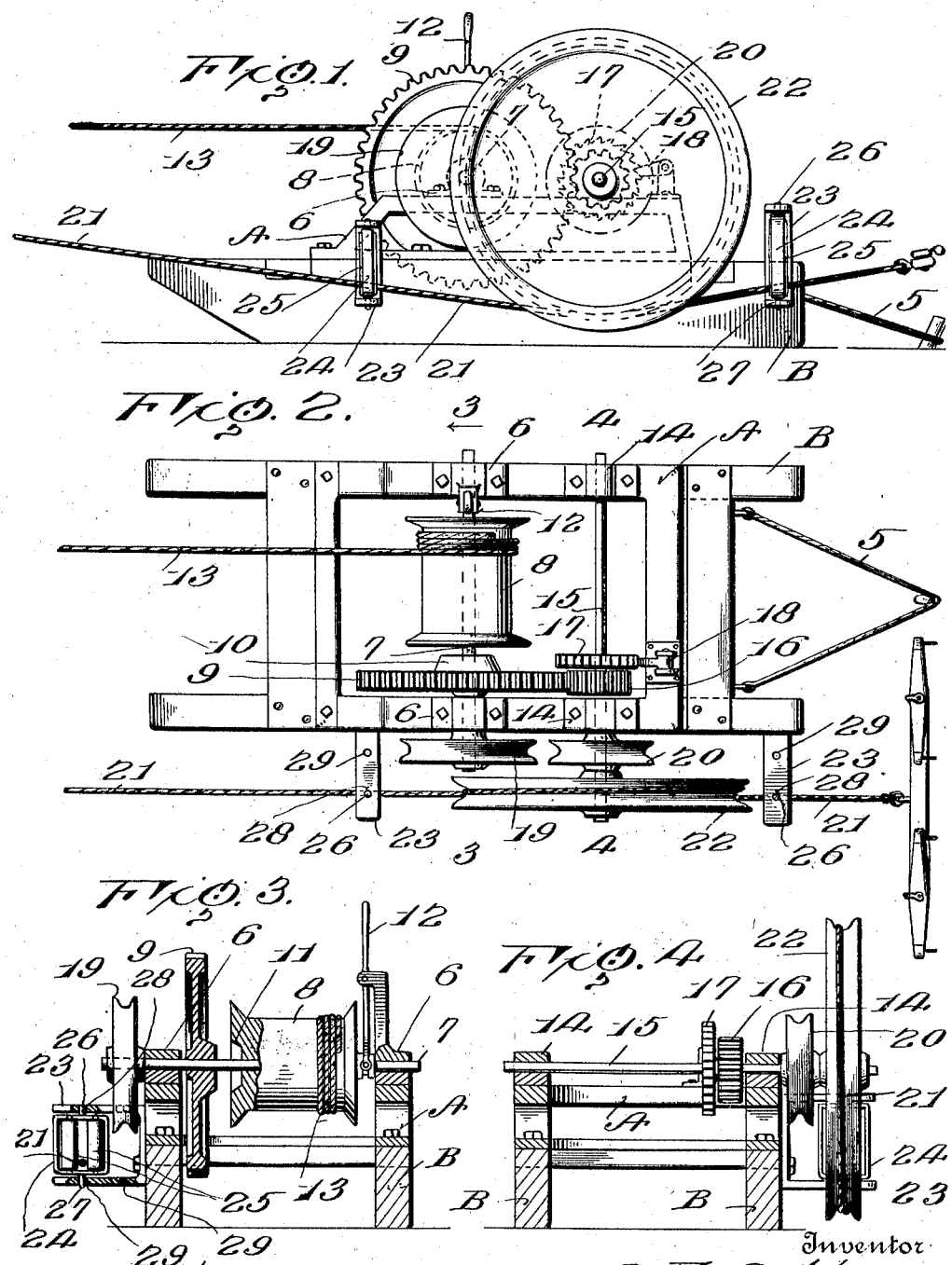
Inventor
J. E. Sotka
By
Attorneys

UNITED STATES PATENT OFFICE.

JOHN E. SOTKA, OF EDEN, WASHINGTON.

STUMP-PULLER.

1,315,429.  Specification of Letters Patent.  Patented Sept. 9, 1919.

Application filed November 23, 1918. Serial No. 263,871.

*To all whom it may concern:*

Be it known that I, JOHN ERNEST SOTKA, a citizen of United States, residing at Eden, in the county of Wahkiakum, State of Washington, have invented certain new and useful Improvements in Stump-Pullers; and I do hereby declare the following to be a full, clear, and exact description of the invention, such as will enable others skilled in the art to which it appertains to make and use the same.

The invention relates to a stump pulling machine and more particularly to the class of movable stump pullers having variable speed control.

The primary object of the invention, is the provision of a stump puller of this character, wherein the winding drum for the stump pulling cable can be driven at different speeds by applied power from a horse, tractor or other power mechanism, the stump puller being readily movable to position the same at the desired location and can be firmly anchored in place.

Another object of the invention is, the provision of a stump puller of this character, wherein the power cable is applied thereto in a novel manner so that the applied power will not interfere with the operation of the stump puller and the winding drum for the stump pulling cable may be driven at different speeds at the option of the user of the machine, the power being applied without the necessity of the use of a sweep beam or the like.

A further object of the invention is, the provision of a machine of this character, wherein the power cable is guided in its travel so as to prevent the working off of the same from the driven part actuated thereby and readily shiftable for controlling the speed of operation of the machine.

A still further object of the invention is, the provision of a machine of this character, which is simple in construction, thoroughly reliable and efficient in its purpose, possessing but few parts and is inexpensive to manufacture.

With the above and other claims in view, the invention consists in the features of construction, combination and arrangement of parts as will be hereinafter fully described, illustrated in the accompanying drawing and pointed out in the claims hereunto appended.

In the accompanying drawing:

Figure 1, is a side elevation of the machine constructed in accordance with the invention.

Fig. 2, is a top plan view thereof.

Fig. 3, is a sectional view on the line 3—3 of Fig. 2.

Fig. 4, is a fragmentary sectional view on the line 4—4 of Fig. 2.

Similar reference characters indicate corresponding parts throughout the several views in the drawing.

Referring to the drawing in detail, A designates generally, the supporting frame of the machine and has fitted thereon at opposite sides the usual sled runners B, so that the machine can be drawn from one point to another in any approved manner. Located at the rear end of the frame A is an anchoring device including a cable 5, which has its ends suitably connected to the frame and this cable can be twisted upon an anchoring stake or a means for holding the machine stationary at the desired point for the use thereof in pulling a stump, in a manner presently described.

Mounted transversely of the frame A and journaled in suitable bearings 6 at opposite sides thereof, is a driven shaft 7 on which is loosely supported a winding and unwinding drum 8, while fixed to the said shaft 7 at one side of the drum is a driven gear 9 formed with a clutch head 10 to engage with a companion clutch recess 11 formed in one end of the drum 8 so that said drum can be made fast with the gear 9 or loose upon the shaft 7, the drum 8 being shiftable upon the shaft for making the same fast or loose through the medium of a shifting lever 12 connected with the drum 8, in any suitable manner for the free rotation of the latter. Fixed to the drum 8 and adapted to be wound on and from the same is a stump pulling cable 13 which is connected at its free end with the stump to be pulled in any suitable manner.

Mounted transversely on the frame A, spaced from the shaft 7 and journaled in suitable bearings 14 is a driven countershaft 15 on which is fixed a pinion 16 meshing with the gear 9, the shaft 15 being also fitted with a ratchet brake wheel 17 engaged by a pawl or dog 18 pivotally supported upon the frame A of the machine and this pawl or dog 18 will lock the shaft 15 against rotation in one direction and will permit the rotation in the reversed direction.

The ends of the shafts 7 and 15 are extended beyond one side of the frame and the shaft 7 has fixed thereto a large peripherally grooved driving wheel or pulley 19, while the shaft 15 has fixed thereto a small peripherally grooved driving wheel or pulley 20, and about either of these wheels is adapted to be coiled a power cable 21 to be hitched to a horse, tractor or other power mechanism for pulling the cable 21 to operate the machine. On changing the cable from either of the wheels or the pulleys 19 and 20 the machine can be driven at two distinct speeds. Also carried on the shaft 15 is a peripherally grooved comparatively large driving pulley or wheel 22 about which can be coiled the power cable 21 to further vary the speed of operation of the machine.

Disposed beyond the grouped pulleys near opposite ends of the frame A and at the same side thereof at which the pulleys are located, are substantially U-shaped guide brackets 23. In each of these U-shaped frames is disposed a rectangular frame 24 and in each rectangular frame is rotatably mounted a pair of spaced vertical guide rollers 25 between which is trained the power cable 21. These rollers 25 serve as a guide to prevent the cable from jumping from the pulley. The rectangular frame is held in place by upper and lower pins 26 and 27 respectively that removably engage perforations 28 and 29 respectively in the upper and lower sides of the corresponding U-shaped frame or bracket 23. It will be noted that there are two of these perforations in the upper side of the U-shaped bracket or frame and there are formed corresponding perforations in the lower side so that the pins of the rectangular frame may be shifted to position the guide rollers 25 with respect to either of the pulley wheels 20 and 22.

What is claimed is:

1. A stump puller comprising a sled frame, shafts journaled transversely on the frame, gear connections between the shafts, a drum loose upon one of the shafts, means for locking the drum with one of the gears, means for controlling the rotation of the other shaft, wheels of varying sizes with respect to each other fixed to the respective shafts, and a power cable engageable with any one of the wheels for driving the same.

2. A stump puller comprising a sled frame, shafts journaled transversely on the frame, gear connections between the shafts, a drum loose upon one of the shafts, means for locking the drum with one of the gears, means for controlling the rotation of the other shaft, wheels of varying sizes with respect to each other fixed to the respective shafts, a power cable engageable with any one of the wheels for driving the same, and means on the frame for guiding the cable on and away from any one of the wheels.

3. A stump puller comprising a sled frame, shafts journaled transversely on the frame, gear connections between the shafts, a drum loose upon one of the shafts, means for locking the drum with one of the gears, means for controlling the rotation of the other shaft, wheels of varying sizes with respect to each other fixed to the respective shafts, a power cable engageable with any one of the wheels for driving the same, means on the frame for guiding the cable on and away from any one of the wheels, and means for moving the drum to engaging and disengaging position with the gear.

4. A stump puller comprising a sled frame, shafts journaled transversely on the frame, gear connections between the shafts, a drum loose upon one of the shafts, means for locking the drum with one of the gears, means for controlling the rotation of the other shaft, wheels of varying sizes with respect to each other fixed to the respective shafts, a power cable engageable with one of the wheels for driving the same, means on the frame for guiding the cable on and away from any one of the wheels, means for moving the drum to engage and disengage with the gear, and anti-friction means included in said guiding means.

In testimony whereof I affix my signature in the presence of two witnesses.

JOHN E. SOTKA.

Witnesses:
ABRAM SOTKA,
A. F. SOTKA.

Copies of this patent may be obtained for five cents each, by addressing the "Commissioner of Patents, Washington, D. C."